United States Patent Office 3,801,622
Patented Apr. 2, 1974

3,801,622
PROCESS FOR PURIFICATION OF
α-UNSATURATED NITRILES
Ryuzo Kimoto and Kazuo Imaoka, Osaka, Masaaki Isurushima, Kyoto, and Kojiro Umemoto, Osaka, Japan, assignors to Takeda Chemical Industries, Ltd., Osaka, Japan
No Drawing. Filed Oct. 1, 1971, Ser. No. 185,917
Claims priority, application Japan, Oct. 13, 1970, 45/90,261
Int. Cl. C07c 121/30, 121/32
U.S. Cl. 260—465.9
4 Claims

ABSTRACT OF THE DISCLOSURE

Process for purifying crude α-unsaturated aliphatic nitriles having 3–5 carbon atoms, which crude nitriles are recovered as an unreacted starting material from the reaction mixture obtained by gas-phase chlorination of an α-unsaturated nitrile having 3–5 carbon atoms, by contacting the crude nitrile with iron, aluminum or their oxides.

---

This invention relates to a process for purification of α-unsaturated aliphatic nitriles having 3 to 5 carbon atoms. More particularly, this invention relates to a process for purification of a crude α-unsaturated nitrile having 3 to 5 carbon atoms, which is recovered from the reaction mixture obtained by a gas-phase colorination of an α-unsaturated aliphatic nitrile having 3 to 5 carbon atoms.

Chlorinated products of α-unsaturated nitriles are useful and valuable intermediates for various chemicals, and the chlorination is most preferably conducted in gas-phase at an elevated temperature.

In the gas-phase chlorination of α-unsaturated nitriles at an elevated temperature, a large excess amount of a nitrile is necessarily used for the reaction with chlorine in order to prevent explosion and combustion, and thus, the unreacted nitrile remaining in the reaction product mixture should be recovered effectively. When the chlorination product obtained by gas-phase chlorination is condensed and then subjected to fractional distillation, the unreacted α-unsaturated nitrile of a purity of not lower than about 99 percent can be recovered on a commercial scale. However, it was quite unexpectedly found that when the thus recovered unreacted α-unsaturated nitriles are re-used for the gas-phase chlorination, there is produced a large amount of polymers which closes the reaction apparatus to such a degree that further continuation of the reaction becomes impossible.

The present inventors conducted an intensive study of the possible causes for the formation of these polymers, and ultimately discovered that the recovered α-unsaturated nitrile is contaminated with a minute amount of chlorination by-products such as methylene chloride, chloroform, carbon tetrachloride, ethylene chloride, chlorinated propenes and chlorinated propanes which cannot be completely removed by fractional distillation, so far as conducting the proces on a commercial scale is concerned, because of the proximity of the boiling points of these materials to those of α-unsaturated nitriles, and that these minute amounts of chlorinated by-products act as telogens to cause telomerization reactions which are responsible for the polymerization.

In an attempt to prevent this polymerization, the present inventors examined many kinds of known polymerization inhibitors including p-tert-butyl catechol, hydroquinone, aminophenols, phosphites, sulfur compounds and so forth, on their stabilizing effect for the polymerization, but none of them could inhibit effectively the polymerization. The present inventors conducted a further study for the prevention of the polymerization and ultimately reached a finding that a minute amount of chlorinated by-products contained in the recovered α-unsaturated nitriles can easily and completely be removed by contacting the nitriles with iron or aluminum or their oxides, and that thus treated nitriles are not polymerized any longer even when they are subjected to a gas-phase chlorination.

The present invention was accomplished on the bases of the foregoing findings.

The principal object of the present invention is to provide an extremely purified α-unsaturated aliphatic nitrile starting from unreacted crude α-unsaturated aliphatic nitriles which are recovered by distillation from a gas-phase chlorination product mixture of the nitrile. Another object of the present invention is to provide a method for preparation of the above-mentioned extremely purified α-unsaturated aliphatic nitrile. Further objects of the present invention will be apparent from the detailed explanation given below.

Thus, the method of the present invention comprises allowing a crude α-unsaturated aliphatic nitrile having 3 to 5 carbon atoms, which is recovered as an unreacted component by distillation of a reaction mixture obtained by a gas-phase chlorination of an α-unsaturated aliphatic nitrile having 3 to 5 carbon atoms at an elevated temperature, to contact with iron or aluminum or their oxides, and then separating the thus treated nitrile from iron or aluminum or their oxides.

The crude α-unsaturated aliphatic nitriles to which the present invention is applicable are those obtained by the following two steps: (1) An α-unsaturated aliphatic nitrile having 3 to 5 carbon atoms such as acrylonitrile, methacrylonitrile, crotononitrile, α-methylcrotononitrile and the like is subjected to a gas-phase chlorination by the process which comprises contacting one mole part of the nitrile in gaseous state with 0.5 to 1.3 mole parts of gaseous chlorine in the presence or absence of water vapor or an inert gas (e.g. nitrogen gas) at about 400° to 550° C., more preferably at about 460° to about 510° C. under atmospheric pressure or under elevated pressure such as 0.2 to 2.0 kg./cm.² G for about 0.1 to 1.0 second. Regarding the gas-phase chlorination process, reference is made to e.g. U.S. Pat. No. 2,466,641. (2) The above obtained reaction mixture is then subjected to distillation to recover an unreacted α-unsaturated aliphatic nitrile separately from the chlorinated compounds. For the distillation, a fractional distillation technique is usually employed. The distillation may be conducted under atmospheric pressure or reduced pressure (e.g. 760–230 mm. Hg). The unreacted α-unsaturated aliphatic nitrile can be recovered as a fraction boiling around its own boiling point, for example acrylonitrile and methacrylonitrile can be recovered as a fraction boiling at 77 to 79° C. and at 86 to 88° C., respectively. The distillation is in general conducted to such an extent that the recovered unreacted α-unsaturated aliphatic nitrile has a purity of about 80 to about 99.9%. Thus recovered crude nitrile is subjected to the purification process of the present invention.

In accordance with this invention, the crude α-unsaturated nitrile is contacted with iron or aluminum or their oxide. When iron or aluminum is exposed to air, all of or a part of its surface is converted to its oxide, and in this invention, such oxide as above may be used equally to the completely pure type. The metal or its oxide of this invention may be in any form, for example, scraps, shavings, ribbons, balls, powders, etc. insofar as they may as such be contacted effectively with the crude α-unsaturated nitriles. An amount of the metal or its oxide to be used varies with the quality of the nitrile, but generally it is, in terms of its surface area, about 0.08 to about 0.8 m.² per 100 kg. of the crude nitrile.

The crude α-unsaturated nitrile is brought into contact with the metal or its oxide in gaseous state or in liquid state, the former being desirable. When the crude nitrile in gaseous state is contacted with the metal, the contact is conducted at a temperature between the boiling point of the crude nitrile and about 500° C., more preferably, about 200° to about 450° C. Though the contact time varies with other conditions such as purity of nitriles, temperature, amount of metal, etc., it is usually in the range of 1.6 to 10 seconds, and the best result is obtained when the contact time is about 4 to 6 seconds. If required, the contact may be effected at an elevated pressure such as 0.2 to 3.0 kg./cm.² G. When a liquid crude nitrile is used, the contact is preferably conducted at a temperature as high as possible under elevated pressure.

An embodiment of gas-phase purification in this invention, which is particularly preferred from an industrial point of view, is described below. The α-unsaturated aliphatic nitrile recovered by fractional distillation, if desired together with a small amount of polymerization inhibitor, for example, p-tert-butylcatechol, is preheated to vaporize the crude nitrile. The gaseous nitrile is fed to the bottom of a vertical type column which is packed with the metal or its oxide and is maintained at about 100 to about 500° C. The nitrile gas goes upwards into the column and it is contacted with the metal or its oxide at the temperature as mentioned above, whereby the minute amounts of impurities in the crude nitrile go downward in the column in liquid state or are deposited on the surface of the metal or its oxide, while the purified nitrile in gaseous state goes out of the top of column. The gaseous purified nitrile taken out of the column top is condensed to give the liquid purified nitrile. If desired, a crude nitrile is fed to the top of a vertical type column and taken out of the bottom of the column. The activity of the metal or its oxide is gradually broken down by the present process, but the inactivated metal or its oxide can be easily regenerated by heating it at about 300° to about 600° C. and subsequently washing the same with water.

EXAMPLE 1

Gaseous methacrylonitrile is reacted with gaseous chlorine in the presence of water vapor at 480° C., the molar ratio of methacrylonitrile:chlorine:water being 1.00:0.80:0.80, reaction time being 0.7 second. The reaction mixture is separated into an aqueous layer and an organic layer. The organic layer is collected and subjected to a fractional distillation using a fractional column (20 mm. x 1000 mm.) packed with Raschig ring (3 mm. in diameter) under such conditions that the bottom temperature is 100° C., the reflux ratio at the column top is 5/1, and a fraction having a boiling point of 85 to 86° C. at the column top is collected. This fraction consists of the crude unreacted methacrylonitrile of 99.4% purity. Yield: 96.0%.

Together with 50 p.p.m. of p-tert-butylcatechol, the above recovered crude methacrylonitrile is fed to the bottom of a column (4 cm. inside diameter and 80 cm. high), which is packed with 400 g. scrap-iron, and maintained at about 220° C., at a flow rate of 960 g./hr. so that the crude methacrylonitrile gas goes upwards in the column and is contacted with the scrap-iron therein at about 220° C. for about 6 seconds. Gaseous substance taken from the top of the column is charged into a condenser wherein the substance is condensed to give a liquid pure methacrylonitrile of purity of 99.6%. Yield: 99.2%.

Thus obtained pure methacrylonitrile is vaporized by heating up to 270° C. and allowed to react with gaseous chlorine under the same conditions as mentioned above. 38.5 kg. of the pure methacrylonitrile is consumed in this chlorination, the amount of polymer substance deposited on the reaction apparatus is only about 0.3 g. and there is observed no plugging of the reaction apparatus.

EXAMPLE 2

Gaseous methacrylonitrile is reacted with gaseous chlorine in the presence of water vapor at 400° C., the molar ratio of methacrylonitrile:chlorine:water vapor being 1.00:0.90:1.00, reaction time being 0.4 second. The reaction mixture is separated into an aqueous layer and an organic layer. The organic layer is collected and subjected to fractional distillation in a manner similar to that in Example 1. A fraction having a boiling point of 85° to 87° C. at the column top is collected. This fraction consists of a crude unreacted methacrylonitrile of purity of 98.8%. Yield: 99.5%.

Together with 50 p.p.m. of p-tert-butylcatechol, the above recovered crude methacrylonitrile is fed to the bottom of a column similar to that in Example 1, which is packed with 400 g. of ribbon-iron, and maintained at about 240° C., at a flow rate of 960 g./hr. so that the crude methacrylonitrile gas goes upwards in the column and is contacted with the ribbon-iron therein at about 230° C. for about 5 seconds. Gaseous substance taken from the top of the column is charged into a condenser wherein the substance is condensed to give a liquid pure methacrylonitrile of purity of 99.1%. Yield: 99.4%.

Thus obtained pure methacrylonitrile is vaporized by heating up to 300° C. and allowed to react with gaseous chlorine under the same conditions as described in Example 1. 49 kg. of the pure methacrylonitrile is consumed in this chlorination, and no polymer substance is deposited on the reaction apparatus.

EXAMPLE 3

Gaseous acrylonitrile is reacted with gaseous chlorine in the presence of water vapor at 500° C., the molar ratio of acrylonitrile:chlorine:water being 1.00:1.00:0.80, reaction time being 0.6 second. The reaction mixture is separated into an aqueous layer and an organic layer. The organic layer is collected and subjected to a fractional distillation in a manner similar to that in Example 1. A fraction having a boiling point of 77° to 79° C. at the column top is collected. This fraction consists of the crude unreacted acrylonitrile of purity of 99.2%. Yield: 94.5%.

Together with 50 p.p.m. of p-tert-butylcatechol, the above recovered crude acrylonitrile is fed to the bottom of a column similar to that in Example 1, which is packed with 400 g. of ball-iron (4.8 mm. in diameter), and maintained at about 300° C., at a flow rate of 960 g./hr. so that the crude acrylonitrile gas goes upwards in the column and is contacted with the ball-iron therein at about 300° C. for about 4 seconds. Gaseous substance taken from the top of the column is charged into a condenser wherein the substance is condensed to give a liquid pure acrylonitrile of purity of 99.4%. Yield: 99.3%.

Thus obtained pure acrylonitrile is vaporized by heating up to 400° C. and allowed to react with gaseous chlorine under the same conditions as described in Example 1. 49 kg. of pure acrylonitrile is consumed in this chlorination, and no polymer substance is deposited on the reaction apparatus.

EXAMPLE 4

Gaseous methacrylonitrile is reacted with gaseous chlorine in the presence of water vapor at 450° C., the molar ratio of methacrylonitrile:chlorine:water vapor being 1.00:0.70:0.80, reaction time being 0.5 second. The reaction is separated into an aqueous layer and an organic layer. The organic layer is collected and subjected to fractional distillation in a manner similar to that in Example 1. A fraction having a boiling point of 85° C. to 87° C. at the column top is collected. This fraction consists of the crude unreacted methacrylonitrile of purity of 99.3%. Yield: 95.5%.

Together with 50 p.p.m. of hydroquinone monomethylether, the above recovered crude methacrylonitrile is fed to the bottom of a column similar to that in Example 1, which is packed with 800 g. of aluminum ribbon and maintained at about 350° C., at a flow rate of 1,020 g./hr. so that the crude methacrylonitrile gas goes upwards in the column and is contacted with the aluminum therein at about 350° C. for about 4 seconds. Gaseous substance taken from the top of the column is charged into a condenser wherein the substance is condensed to give a liquid pure methacrylonitrile of purity of 99.6%. Yield: 99.0%.

Thus obtained pure methacrylonitrile is vaporized by heating up to 280° C. and allowed to react with gaseous chlorine under the same conditions as described in Example 1. 12 kg. of the pure methacrylonitrile is consumed in this chlorination, the amount of polymer substance deposited on the reaction apparatus is only about 1.0 g., and there is observed no plugging of the reaction apparatus.

REFERENCE 1

To the crude unreacted methacrylonitrile (purity: 99.4%) obtained in Example 1 is added 150 p.p.m. of p-tert-butylcatechol, and the mixture is subjected to evaporation at 170° C., at a flow rate of 960 g./hr. Thus treated methacrylonitrile is vaporized by heating up to 220° C. and allowed to react with gaseous chlorine under the same conditions as described in Example 1. When 6.6 kg. of the methacrylonitrile is consumed in this reaction, the reaction apparatus is plugged with polymer substance and continuation of the reaction becomes impossible. The total amount of polymer substance produced is in 67.5 g.

REFERENCE 2

To the crude unreacted acrylonitrile (purity: 99.2%) obtained in Example 3 is added 25 p.p.m. of hydroquinone monomethyl ether, and the mixture is subjected to evaporation at 210° C. at a flow rate of 960 g./hr. Thus treated methacrylonitrile is vaporized by heating up to 250° C. and allowed to react with gaseous chlorine under the same conditions as described in Example 1. When 15.4 kg. of the acrylonitrile is consumed in this reaction, the reaction apparatus is plugged with polymer substance and continuation of the reaction becomes impossible. The total amount of polymer substance produced is 58 g.

What is claimed is:

1. A process for purifying an α-unsaturated nitrile selected from the group consisting of acrylonitrile, methacrylonitrile, crotononitrile and α-methylcrotononitrile, recovered by distillation as an unreacted component from a reaction mixture obtained by reacting acrylonitrile, methacrylonitrile, crotononitrile or α-methylcrotononitrile with chlorine in gaseous state at a temperature of 400 to 550° C., which comprises treating the α-unsaturated nitrile, in gaseous state, with iron, aluminum or their oxide at a temperature ranging from the boiling point of the α-unsaturated nitrile to 500° C. under a pressure of 0.2 to 3.0 kg./cm.$^2$ G for 1.6 to 10 seconds, and separating the thus treated nitrile from the iron, aluminum or their oxide.

2. A process according to claim 1, wherein the treatment is conducted at a temperature in the range of 200° to 450° C.

3. A process according to claim 1, wherein the α-unsaturated nitrile is acrylonitrile.

4. A process according to claim 1, wherein the α-unsaturated nitrile is methacrylonitrile.

References Cited

UNITED STATES PATENTS

| 2,351,157 | 6/1944 | Semon | 260—465.8 R X |
| 2,466,641 | 4/1949 | Hearne et al. | 260—465.7 |
| 3,627,765 | 12/1971 | Tsurushima | 260—465.7 |

OTHER REFERENCES

N. V. de Bataafsche, C.A., vol. 45 (1951), pp. 174–175.

JOSEPH P. BRUST, Primary Examiner

U.S. Cl. X.R.

260—465.7